No. 650,667. Patented May 29, 1900.
J. B. BURCH.
DREDGE.
(Application filed Feb. 8, 1900.)

(No Model.) 3 Sheets—Sheet I.

Witnesses Inventor
J. B. Burch
by H. B. Willson & Co.
Attorneys

No. 650,667. Patented May 29, 1900.
J. B. BURCH.
DREDGE.
(Application filed Feb. 8, 1900.)
(No Model.) 3 Sheets—Sheet 2.

Witnesses Inventor
J. B. Burch
by H. B. Willson &co.
Attorneys

No. 650,667. Patented May 29, 1900.
J. B. BURCH.
DREDGE.
(Application filed Feb. 8, 1900.)
(No Model.) 3 Sheets—Sheet 3.
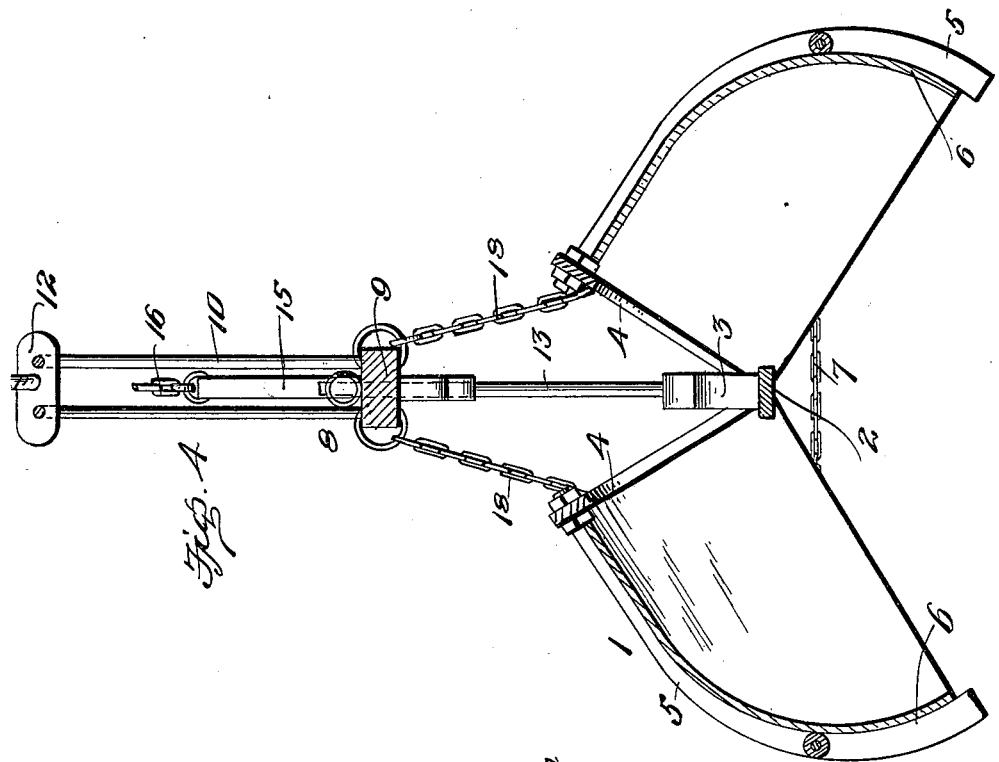
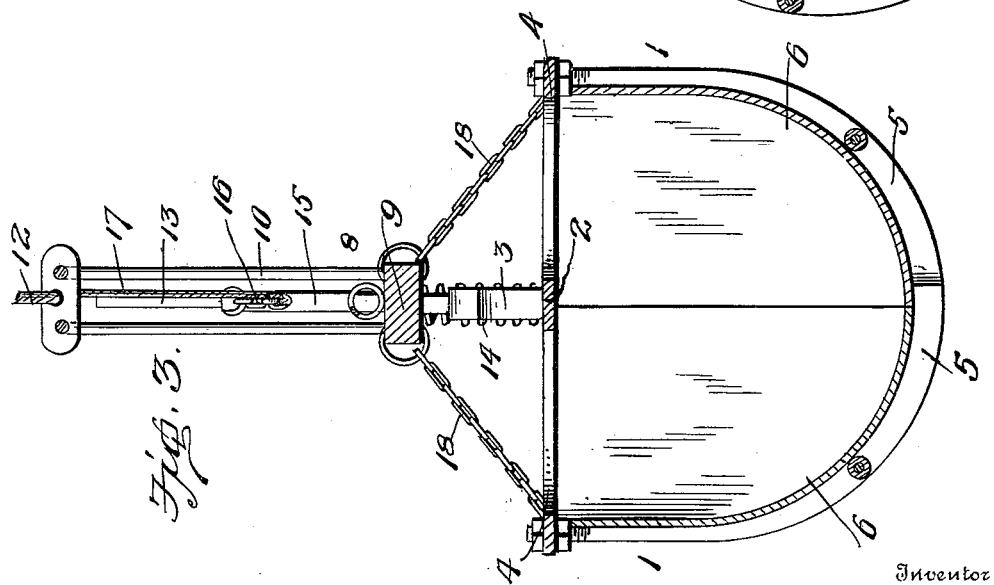
Witnesses
Inventor
J. B. Burch
Attorneys

United States Patent Office.

JOHN B. BURCH, OF BOWLING GREEN, KENTUCKY.

DREDGE.

SPECIFICATION forming part of Letters Patent No. 650,667, dated May 29, 1900.

Application filed February 8, 1900. Serial No. 4,481. (No model.)

*To all whom it may concern:*

Be it known that I, JOHN B. BURCH, a citizen of the United States, residing at Bowling Green, in the county of Warren and State of Kentucky, have invented certain new and useful Improvements in Dredges; and I do declare the following to be a full, clear, and exact description of the invention, such as will enable others skilled in the art to which it appertains to make and use the same.

The invention relates to dredges.

The object of the invention is to provide a dredge which shall be simple of construction, durable in use, comparatively inexpensive of production, and which will perform its work in an efficient manner.

To this end the invention consists in certain features of construction and combination of parts, which will be hereinafter fully described and claimed.

Figure 1:
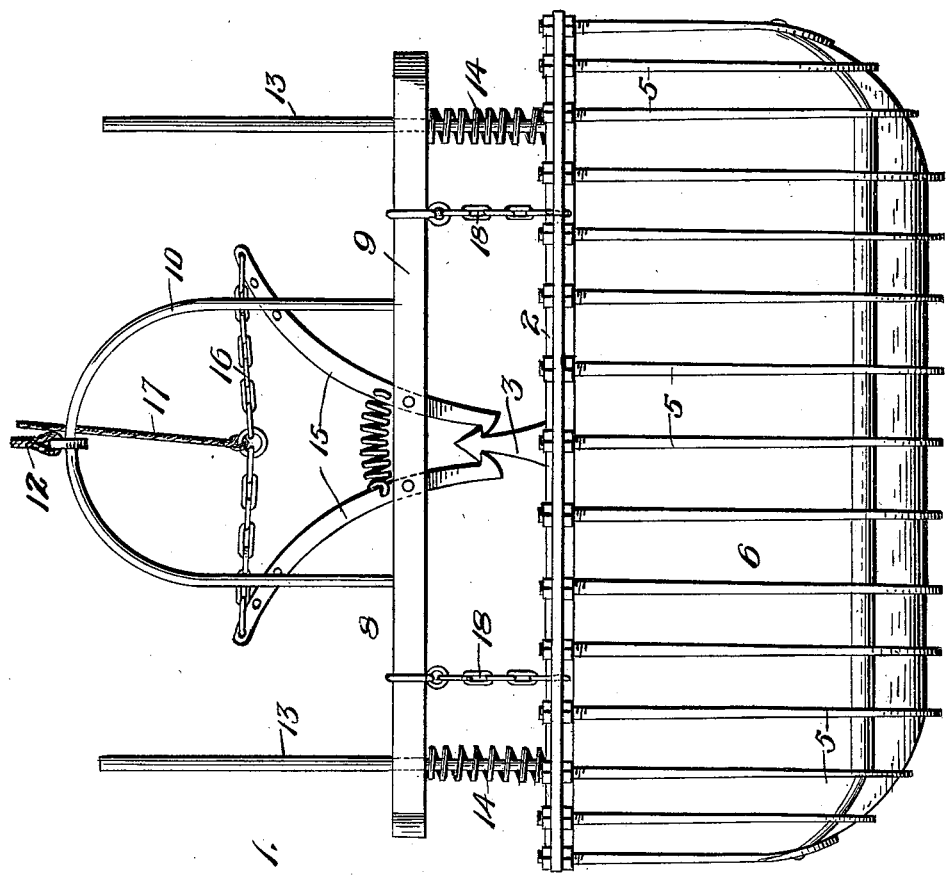
Figure 2:
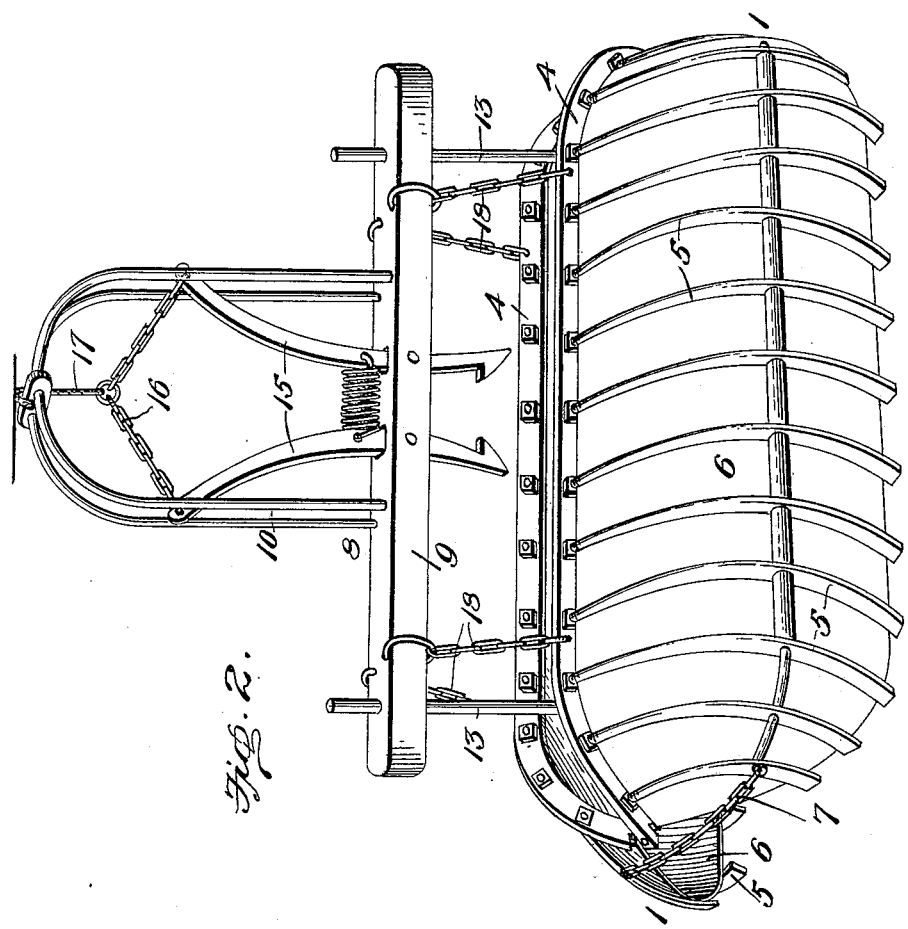

In the accompanying drawings, Figure 1 is a perspective view of the dredge, showing the scoop-sections closed. Fig. 2 is a similar view showing them open. Fig. 3 is a cross-sectional view through Fig. 1. Fig. 4 is a similar view through Fig. 2.

In the drawings the same reference characters indicate the same parts of the invention.

1 denotes the scoop-sections of the dredge, which are pivoted at their upper ends to the ends of a bar 2, formed with a catch-head 3, preferably of arrow shape. Each section consists of a curved bar 4, to which are bolted the grapple-arms 5, to which is secured the sheath 6.

7 denotes chains or similar fastening means connected to the two scoop-sections to limit the spreading of such sections.

8 denotes a latch-frame, which consists of a heavy bar 9, having bails 10, to which the rope 12 of the lifting-rig is attached. This bar is mounted to slide vertically upon guide-rods 13, bolted to the hinged bar 2, and seats upon coil-springs 14, placed around said rods. 15 denotes spring-actuated trip-hooks pivoted to said weighted bar 9 and adapted to have their hooked ends engage the arrow-head of the bar 2. The upper ends of these levers are connected by a chain 16, to which is attached a trip-cord 17. 18 denotes chains or connections, one end of each being attached to the weighted bar and the other to the upper end of each scoop-section.

The operation of the dredge is as follows: In descending the dredge is supported by the rope 12 of the lifting-rig, and the scoop-sections are spread apart. After they have buried themselves into the material desired to be removed or lifted the weighted bar is allowed to suddenly drop its full limit and striking the springs compresses said springs, and the hooks of the trip-levers engage the arrow-head and lock thereto. Now in elevating the dredge the lower ends of the scoop-sections close around the material with which the dredge has been brought into contact, and the dredge is elevated. When it is desired to discharge the contents of the dredge, the trip-rope 12 is operated, which compresses the upper ends of the trip-levers and releases their lower ends from engagement with the arrow-head. After the arrow-head has been released the scoop-sections of the dredge will open, as shown in Fig. 2, and be discharged of their contents.

From the foregoing description, taken in connection with the accompanying drawings, the construction, operation, and advantages of my improved dredge will be readily apparent without requiring an extended explanation. It will be seen that the device is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent of the United States, is—

1. In a dredge, the combination with scoop-sections hinged together, a bar carried by the hinged sections and provided with a catch-head, a weighted bar supported by and above the first-named bar, connections between the upper ends of the scoop-sections and the weighted bar, connections near the lower ends of the scoop-sections to limit the spread of said sections, and trip-levers carried by the weighted bar and adapted to engage the catch-head, and when so engaged hold the scoop-sections closed, substantially as set forth.

2. In a dredge, the combination with scoop-sections hinged together, of a bar pivoted to said sections and provided with a catch-head and with vertical guide-rods, a weighted bar mounted to slide upon said guide-rods above the first-named bar, springs carried by said guide-bar for supporting the weighted bar, connections between the upper ends of the scoop-sections and the weighted bar, connections near the lower ends of the scoop-sections to limit the spread of said sections, and trip-levers carried by the weighted bar and adapted to engage the catch-head and when so engaged hold the scoop-sections closed, substantially as set forth.

3. In a dredge the combination with the scoop-sections hinged together at their upper ends; of a bar pivoted to said sections and provided with a catch-head, a weighted bar supported by and above the first-named bar, flexible connections between the upper ends of the scoop-sections and the weighted bar, flexible connections between the lower ends of the scoop-sections, and trip-levers carried by the weighted bar and adapted to engage the catch-head and when so engaged hold the scoop-sections closed, substantially as and for the purpose set forth.

In testimony whereof I have hereunto set my hand in presence of two subscribing witnesses.

J. B. BURCH.

Witnesses:
M. J. HANLEY,
A. C. CHERRY.